United States Patent
Yamauchi et al.

(10) Patent No.: US 9,453,596 B2
(45) Date of Patent: Sep. 27, 2016

(54) MEMBER WITH FLOW PASSAGE AND METHOD FOR MANUFACTURING THE SAME

(75) Inventors: Yuichiro Yamauchi, Kanagawa (JP); Hidemitsu Hideshima, Kanagawa (JP); Satoshi Hirano, Kanagawa (JP)

(73) Assignee: NHK Spring Co., Ltd., Yokohama-shi (JP)

(*) Notice: Subject to any disclaimer, the term of this patent is extended or adjusted under 35 U.S.C. 154(b) by 285 days.

(21) Appl. No.: 14/237,224

(22) PCT Filed: Aug. 6, 2012

(86) PCT No.: PCT/JP2012/070018
§ 371 (c)(1),
(2), (4) Date: Feb. 11, 2014

(87) PCT Pub. No.: WO2013/021976
PCT Pub. Date: Feb. 14, 2013

(65) Prior Publication Data
US 2014/0209202 A1 Jul. 31, 2014

(30) Foreign Application Priority Data
Aug. 9, 2011 (JP) ................................. 2011-174401

(51) Int. Cl.
*F16L 9/00* (2006.01)
*F16L 9/02* (2006.01)
(Continued)

(52) U.S. Cl.
CPC .................. *F16L 9/02* (2013.01); *C23C 24/04* (2013.01); *F28F 3/12* (2013.01); *F28F 7/02* (2013.01)

(58) Field of Classification Search
CPC ............. F16L 9/02; C23C 24/04; F28F 3/12; F28F 7/02

USPC .............. 138/156, 140, 141, 143, 170, 171; 427/455, 456
See application file for complete search history.

(56) References Cited

U.S. PATENT DOCUMENTS

| | | | | |
|---|---|---|---|---|
| 377,318 A | * | 1/1888 | Marshall | 138/177 |
| 1,608,905 A | * | 11/1926 | Murray | B21D 15/02 |
| | | | | 122/235.14 |

(Continued)

FOREIGN PATENT DOCUMENTS

| | | |
|---|---|---|
| CN | 101348904 A | 1/2009 |
| JP | 62-263956 A | 11/1987 |

(Continued)

OTHER PUBLICATIONS

International Search Report dated Sep. 18, 2012, issued for PCT/JP2012/070018.

(Continued)

*Primary Examiner* — Paul R Durand
*Assistant Examiner* — Vishal Pancholi
(74) *Attorney, Agent, or Firm* — Locke Lord LLP; James E. Armstrong, IV; Howard M. Gitten

(57) ABSTRACT

A member with flow passage includes: a base member; a plate-like member including two flat plate portions that are positioned at both widthwise ends and have main surfaces passing over one and the same plane, and a convex portion that is provided between the two flat plate portions and has a cross section shaped in a thickness direction so as to protrude with respect to the flat plate portions, and forming the flow passage; and a metal deposit layer that is formed by, while main surfaces of the flat plate portions opposite to a top of the convex portion are facing the base member, accelerating powder of metal or alloy together with a gas, and spraying and depositing the powder in a solid-phase state on a surface of the plate-like member at the top side of the convex portion and a surface of the base member.

16 Claims, 17 Drawing Sheets

(51) Int. Cl.
*C23C 24/04* (2006.01)
*F28F 7/02* (2006.01)
*F28F 3/12* (2006.01)

(56) References Cited

U.S. PATENT DOCUMENTS

| | | | | |
|---|---|---|---|---|
| 2,021,995 | A * | 11/1935 | Heath | F28F 3/12 165/164 |
| 3,095,255 | A * | 6/1963 | Smith | F25B 39/02 138/143 |
| 3,734,178 | A * | 5/1973 | Soudron | F24H 1/38 165/170 |
| 5,996,633 | A * | 12/1999 | Kato | F28D 1/0316 138/116 |
| 6,200,642 | B1 * | 3/2001 | Kanai | B23K 35/0238 427/455 |
| 6,428,630 | B1 * | 8/2002 | Mor | C23C 4/18 148/254 |
| 6,749,901 | B1 * | 6/2004 | Ghosh | B23K 1/0004 228/183 |
| 7,862,659 | B2 | 1/2011 | Lim et al. | |
| 2002/0050343 | A1 | 5/2002 | Kawamoto | |
| 2009/0139706 | A1 * | 6/2009 | Aoki | H05K 7/20254 165/185 |

FOREIGN PATENT DOCUMENTS

| | | | |
|---|---|---|---|
| JP | EP 0542534 A1 * | 5/1993 | ............. F28F 13/00 |
| JP | 10-018911 A | 1/1998 | |
| JP | 2009-013497 A | 1/2009 | |
| JP | 2010-234756 A | 10/2010 | |
| WO | WO-03/001136 A1 | 1/2003 | |

OTHER PUBLICATIONS

Office Action dated Dec. 17, 2014, issued for the corresponding Chinese patent application No. 201280038555.4 and English translation thereof.
Supplementary European Search Report mailed Mar. 19, 2015, issued for the European patent application No. 12822351.8.

* cited by examiner

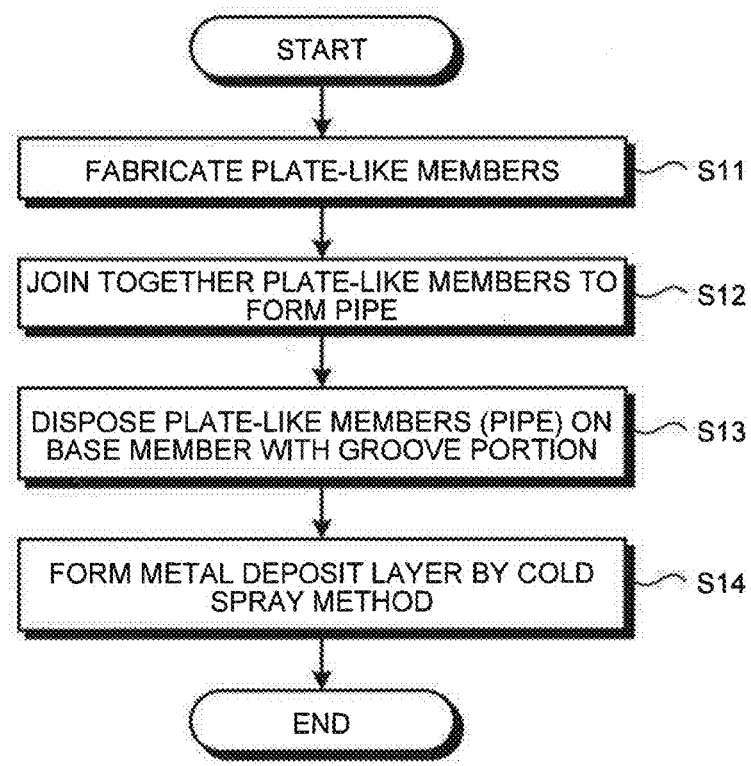

FIG.9
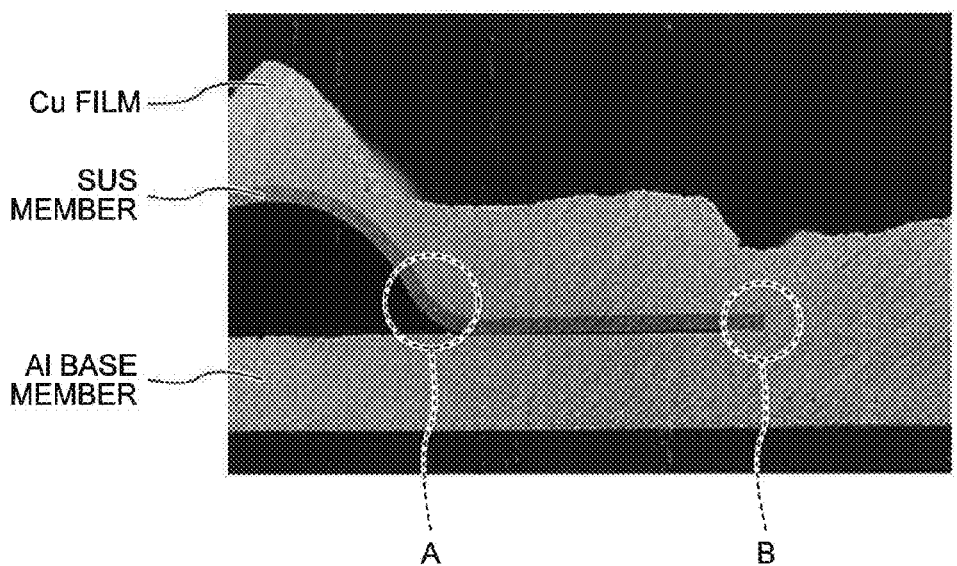
FIG.10A
| | θ | STATE OF Cu FILM |
|---|---|---|
| EXAMPLE | 90° | WITH PORE (△) |
| EXAMPLE | 100° | WITH PORE (△) |
| EXAMPLE | 110° | WITHOUT PORE (○) |
| EXAMPLE | 120° | WITHOUT PORE (○) |
| EXAMPLE | 130° | WITHOUT PORE (○) |
FIG.10B
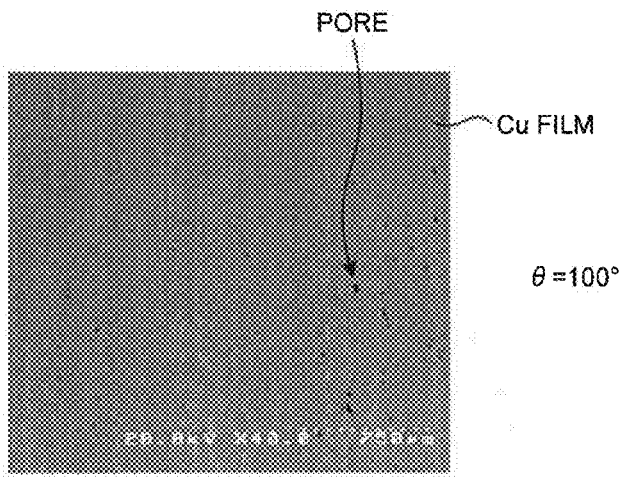
$\theta = 100°$ FIG.10C
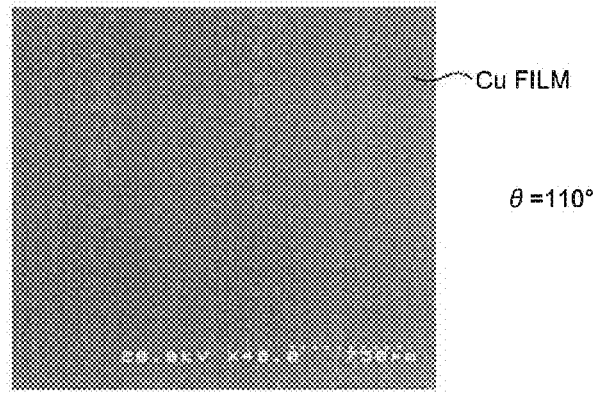
FIG.11A
| | $t_0$ | STATE OF Cu FILM |
|---|---|---|
| EXAMPLE | 0.1 mm | ○ |
| EXAMPLE | 0.2 mm | ○ |
| EXAMPLE | 0.4 mm | △ |
| EXAMPLE | 0.8 mm | △ |
| COMPARATIVE EXAMPLE | 1.0 mm | × |
| COMPARATIVE EXAMPLE | 2.0 mm | × |
FIG.11B
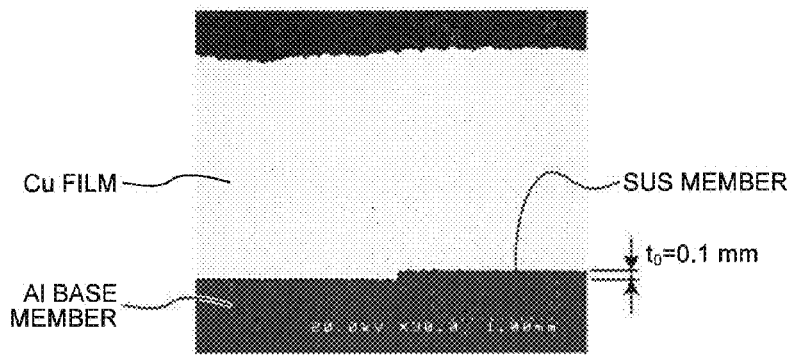
FIG.11C
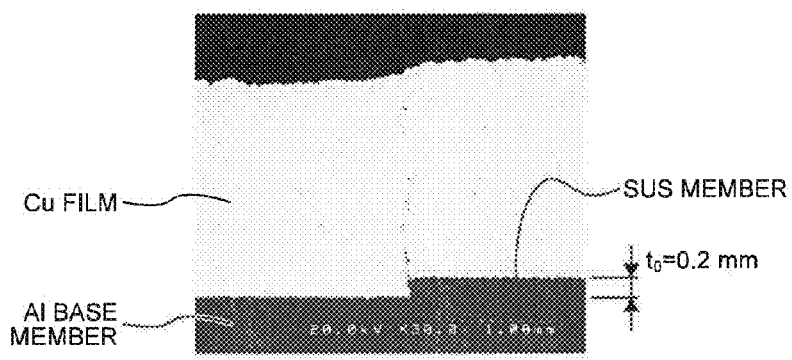

MEMBER WITH FLOW PASSAGE AND METHOD FOR MANUFACTURING THE SAME

FIELD

The present invention relates to a member with flow passage for use in adjustment of substrate temperature, gas supply, or the like, in the manufacturing process of semiconductors, liquid crystal display devices, optical discs, or the like, and a method for manufacturing the same.

BACKGROUND

There have been used structures with flow passage (members with flow passages) to let a fluid pass into plate-like metallic members in a wide variety of applications to process substrates for manufacture of semiconductors, liquid crystal display devices, optical discs, or the like. For example, a member with flow passage through which a heat medium (refrigerant) passes can be used as a temperature adjustment device (cold plate or the like) for adjustment of substrate temperature (cooling or heating) (e.g., refer to Patent Literature 1). In addition, a member with flow passage through which gas having a predetermined component passes can be used as a shower plate to supply the gas to a substrate.

Such a member with flow passage is manufactured by fabricating separately a pipe for letting a fluid pass and a plate-like metallic member with a concave portion formed by a drilling process or the like corresponding to the pipe, and then placing the pipe on the concave portion of the metallic member.

CITATION LIST

Patent Literature

Patent Literature 1: Japanese Laid-open Patent Publication No. 2009-13497

SUMMARY

Technical Problem

However, at fabrication of the member with flow passage as described above, it is difficult to allow the concave portion formed in the metallic member and the pipe to adhere and join to each other without a gap therebetween. Thus, a gap is generated between the concave portion in the metallic member and the wall surface of the pipe with increased thermal resistance. Accordingly, there is the possibility that thermal conductivity and thermal uniformity decrease between the fluid flowing in the pipe and the metallic member, foreign matter enters the gap, or the pipe becomes shaky due to the gap.

The present invention has been made in view of the abovementioned issues, and an object of the present invention is to provide a member with flow passage that is improved in adhesion between the wall surface constituting the flow passage and the metallic member, and a method for manufacturing the same.

Solution to Problem

To solve the problem described above and achieve the object, a member with flow passage provided thereinside according to the present invention includes: a base member made of metal or alloy; a plate-like member made of metal or alloy in a plate-like shape, including: two flat plate portions that are positioned at both widthwise ends and have main surfaces passing over one and the same plane; and a convex portion that is provided between the two flat plate portions and has a cross section shaped in a thickness direction so as to protrude with respect to the flat plate portions, and forming the flow passage; and a metal deposit layer that is formed by, while main surfaces of the flat plate portions opposite to a top of the convex portion are facing the base member, accelerating powder of metal or alloy together with a gas, and spraying and depositing the powder in a solid-phase state on a surface of the plate-like member at the top side of the convex portion and a surface of the base member.

The member with flow passage further includes a second plate-like member made of metal or alloy in a plate-like shape, and joined to the opposite main surfaces of the plate-like member such that the flow passage is formed together with the plate-like member.

In the above-described member with flow passage, the second plate-like member has a flat-plate shape.

In the above-described member with flow passage, the second plate-like member includes: two second flat plate portions that are positioned at both widthwise ends and have main surfaces passing over one and the same plane; and a second convex portion that is provided between the two second flat plate portions and has a cross section shaped in a thickness direction so as to protrude with respect to the second flat plate portions, and is joined at main surfaces of the two second flat plate portions opposite to a top of the second convex portion, to the opposite main surfaces of the two flat plate portions of the plate-like member, the base member has a concave portion that is formed on a flat surface and is capable of placement of the second convex portion, and the metal deposit layer is formed while the second convex portion is placed in the concave portion.

In the above-described member with flow passage, the second plate-like member is wider than the plate-like member.

In the above-described member with flow passage, end portions of the plate-like member are wider with increasing proximity to the base member.

In the above-described member with flow passage, the end portions of the plate-like member are wider with increasing proximity to the base member, and end portions of the second plate-like member are wider with increasing proximity to the base member and extend outward beyond the plate-like member.

In the above-described member with flow passage, an angle formed by the flat plate portions and a direction in which the convex portion rises with respect to the flat plate portions is smaller than 90 degrees.

In the above-described member with flow passage, the angle formed by the flat plate portions and the direction in which the convex portion rises with respect to the flat plate portions is smaller than 70 degrees.

In the above-described member with flow passage, a step height between the surface of the base member and the upper surface of the plate-like member is 0.8 mm or less.

In the above-described member with flow passage, the base member is formed by accelerating powder of metal or alloy together with a gas, and spraying and depositing the powder in the solid-phase state at least on a surface of the second plate-like member.

In the above-described member with flow passage, the plate-like member is made of stainless steel, copper, or copper alloy, and the base member and the metal deposit layer are made of aluminum or aluminum alloy.

In the above-described member with flow passage, the second plate-like member is made of stainless steel, copper, or copper alloy.

A method for manufacturing a member with flow passage according to the present invention in which a flow passage is provided in the member made of metal or alloy, includes: a step of placing, on a base member made of metal or alloy, a plate-like member made of metal or alloy in a plate-like shape, including: two flat plate portions that are positioned at both widthwise ends and have main surfaces passing over one and the same plane; and a convex portion that is provided between the two flat plate portions and has a cross section shaped in a thickness direction so as to protrude with respect to the flat plate portions, and forming the flow passage, such that main surfaces of the flat plate portions opposite to a top of the convex portion are facing the base member; and a metal deposit layer formation step of forming a metal deposit layer by, while the plate-like member is placed on the base member, accelerating powder of metal or alloy together with a gas, and spraying and depositing the powder in a solid-phase state on a surface of the plate-like member at the top side of the convex portion and a surface of the base member.

In the above-described method for manufacturing a member with flow passage, the plate-like member placing step includes placing, on the base member, a second plate-like member made of metal or alloy in a plate-like shape, and joined to the opposite main surfaces of the plate-like member such that the flow passage is formed together with the plate-like member.

In the above-described method for manufacturing a member with flow passage, the plate-like member disposition step includes disposing the second plate-like member that is made of metal or alloy, is plate-like in shape, includes: two second flat plate portions that are positioned at both widthwise ends, have main surfaces passing over one and the same plane, and are joined to the two flat plate portions of the plate-like member; and a second convex portion that is provided between the two second flat plate portions and has a cross section shaped in a thickness direction so as to protrude with respect to the second flat plate portions, in a concave portion that is formed on a flat surface of the base member and is capable of placement of the second convex portion, and the metal deposit layer formation step includes forming the metal deposit layer while the second convex portion is placed in the second concave portion.

In the above-described method for manufacturing a member with flow passage, the method further includes a second metal deposit layer formation step of removing the base member, accelerating powder of metal or alloy together with a gas, and spraying and depositing the powder in a solid-phase state on a surface of the second plate-like member and an exposed surface of the metal deposit layer.

Advantageous Effects of Invention

According to the present invention, a plate-like member having a flat portion and a convex portion is disposed on a substrate, powder of metal or alloy is accelerated together with a gas to spray and deposit the powder in the solid-phase state on the surface of the convex portion-side of the plate-like member and the surface of the substrate and, thereby forming the metal deposit layer. This improves adhesion between the convex portion of the plate-like member as flow passage of heat medium and a member composed of the metal deposit layer.

BRIEF DESCRIPTION OF DRAWINGS

FIG. 3 is a flowchart of a method for manufacturing the member with flow passage illustrated in FIG. 1.

FIG. 9 is a photograph of a metal deposit layer formed on the plate-like member illustrated in FIG. 8.

FIG. 10A is a table giving the states of copper films with changes in inclination θ of a convex portion.

FIG. 10B is a photograph showing the state of the copper film with θ=100°.

FIG. 10C is a photograph showing the state of the copper film with θ=110°.

FIG. 11A is a table giving the state of the foregoing films with changes in thickness $t_0$ of an end portion.

FIG. 11B is a photograph showing the state of the copper film with $t_0$=0.1 mm.

FIG. 11C is a photograph showing the state of the copper film with $t_0$=0.2 mm.

DESCRIPTION OF EMBODIMENTS

Figure 1:
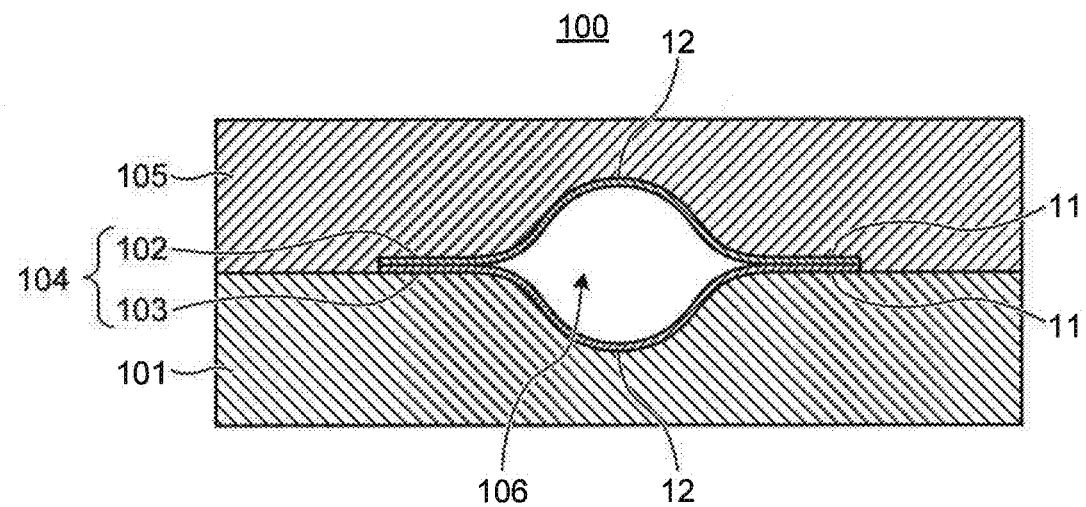
FIG. 1 is a cross-section view of a structure of a member with flow passage according to a first embodiment of the present invention.

Embodiments for carrying out the present invention will be described below in detail with reference to the drawings. The present invention is not limited by the following embodiments. The drawings referred to in the following description are mere schematic indications of shapes, sizes, and positional relationships to an extent that the contents of the present invention can be understood. That is, the present invention is not limited to the shapes, sizes, and positional relationships illustrated in the drawings.

First Embodiment

FIG. 1 is a cross-section view of a structure of a member with flow passage according to a first embodiment of the present invention.

As illustrated in FIG. 1, a member with flow passage 100 according to the first embodiment is formed by a base member 101 and two plate-like members 102 and 103, and includes a pipe 104 placed on the base member 101 and a metal deposit layer 105 formed on surfaces of the pipe 104 and the base member 101. The member with flow passage 100 is used as a temperature adjustment device (for example, cold plate) or a fluid supply device (for example, shower plate) or the like to flow a desired fluid (liquid or gas) in the pipe 104.

The base member 101 is made of metal or alloy. The kind of the metal or alloy is selected as appropriate according to the use of the member with flow passage 100. For example, when the member with flow passage 100 is to be utilized as a temperature adjustment device, used as a material for the base member 101 is aluminum or aluminum alloy with favorable thermal conductivity or the like. When the metal deposit layer 105 side of the base member 101 is to be utilized as a placement surface for a target object to be adjusted in temperature, the material for the base member 101 may be selected from the viewpoint of ease of processing.

Figure 2:
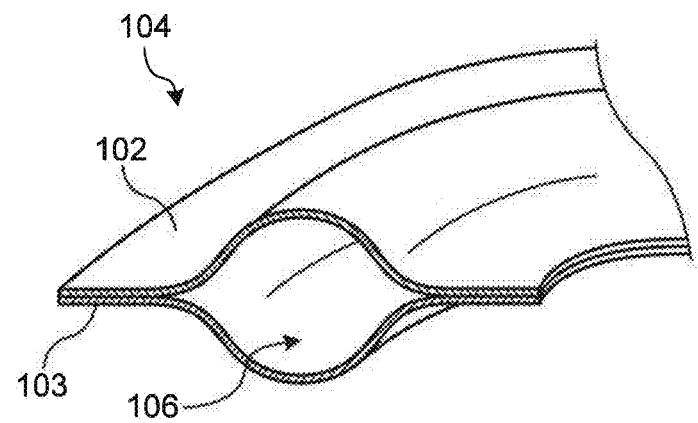
FIG. 2 is a perspective view of an outer appearance of a pipe illustrated in FIG. 1.

As illustrated in FIG. 2, the two plate-like members 102 and 103 constituting the pipe 104 include: two flat plate portions 11 that are positioned at both widthwise ends and have main surfaces passing over one and the same plane; and convex portions 12 that have cross sections along plate thickness protruded with respect to the flat plate portions 11. The plate-like members 102 and 103 are joined together such that respective main surfaces of the flat plate portions 11 opposite to the tops of the convex portions 12 face each other. Accordingly, a space 106 formed between the two convex portions 12 constitutes a flow passage for flowing a fluid.

The plate-like members 102 and 103 are made of metal or alloy. The kind of the metal or alloy is selected according to the kind of a fluid to be flown in the flow passage (space) 106. For example, when the member with flow passage 100 is to be utilized as a temperature adjustment device and urban water or sea water is to be used as a heat medium (refrigerant), stainless steel (SUS) with favorable thermal conductivity and corrosion resistance to the heat medium or the like may be employed. When PCW (process cooling water), organic solvent, inactive gas, or the like is to be used as a heat medium, aluminum or aluminum alloy with favorable thermal conductivity may be employed.

The metal deposit layer 105 is formed by a so-called cold spray method by which powder of metal or alloy is accelerated together with a gas to spray and deposit the powder in the solid-phase state on a surface of the pipe 104 and an upper surface of the surrounding base member 101 (hereinafter, referred to collectively as deposit layer formation surface). The kind of the metal or alloy is selected according to the use of the member with flow passage 100. For example, when the member with flow passage 100 is to be utilized as a temperature adjustment device, the metal deposit layer 105 may be made of copper, copper alloy, aluminum, or aluminum alloy with favorable thermal conductivity or the like. The material for the metal deposit layer 105 may be the same as or different from the material for the base member 101.

Next, a method for manufacturing the member with flow passage 100 will be described. FIG. 3 is a flowchart of a method for manufacturing the member with flow passage 100.

First, at step S11, the plate-like members 102 and 103 are fabricated by subjecting a rolled plate to press working or the like to form convex portions 12, for example. The requirements for shape and thickness of the plate-like members 102 and 103 will be described later.

Figure 4A:
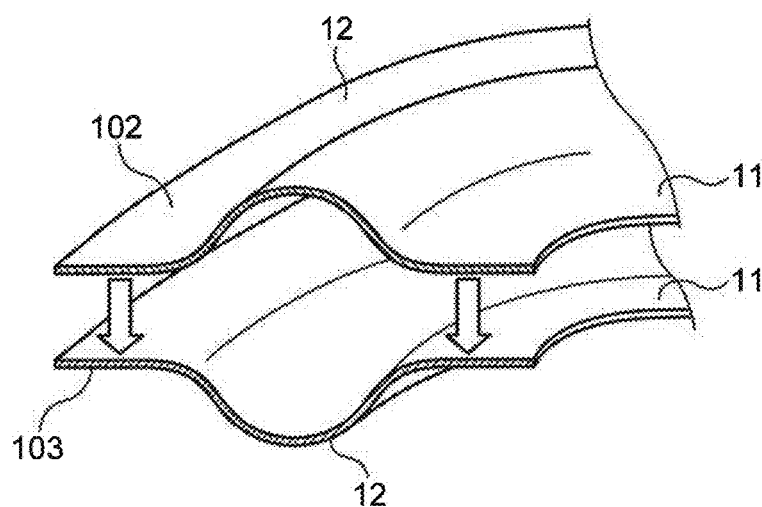
FIG. 4A is a cross-section view for describing the method for manufacturing the member with flow passage illustrated in FIG. 1.

At subsequent step S12, as illustrated in FIG. 4A, the flat plate portions 11 of the plate-like members 102 and 103 face each other with the tops of the convex portions 12 faced outward, and then the flat plate portions 11 are joined together by seam welding or the like to fabricate the pipe 104 (refer to FIG. 2).

Figure 4B:
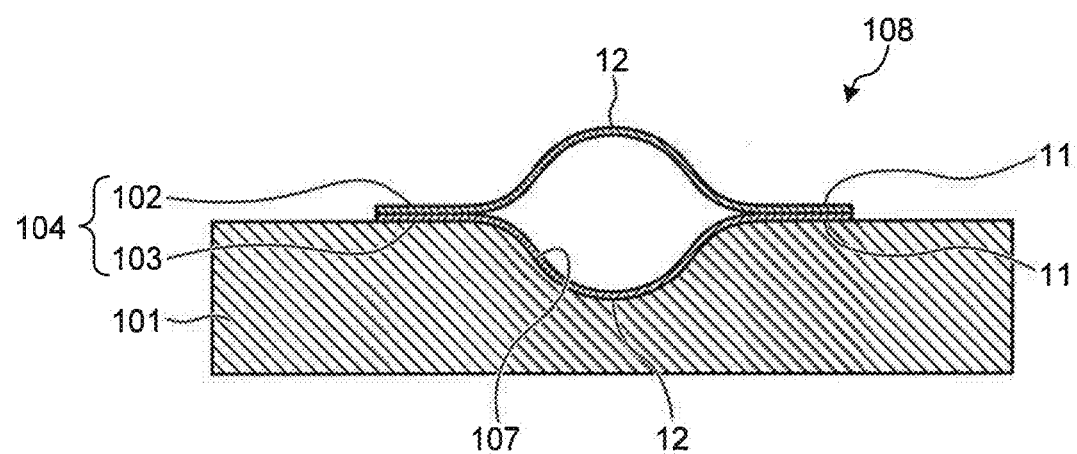
FIG. 4B is a cross-section view for describing the method for manufacturing the member with flow passage illustrated in FIG. 1.

At step S13, as illustrated in FIG. 4B, the pipe 104 fabricated from the plate-like members 102 and 103 is placed on the base member 101 in which a concave portion 107 is formed in advance for placement of the convex portions 12. At that time, one plate-like member 103 may be fixed to the base member 101 by brazing or using an adhesive, bolts, or the like, or merely fitting the convex portions 12 into the concave portion 107.

At step S14, the metal deposit layer 105 is formed by the cold spray method on the surface of the pipe 104 and the upper surface of the surrounding base member 101 (deposit layer formation surface 108).

Figure 5:
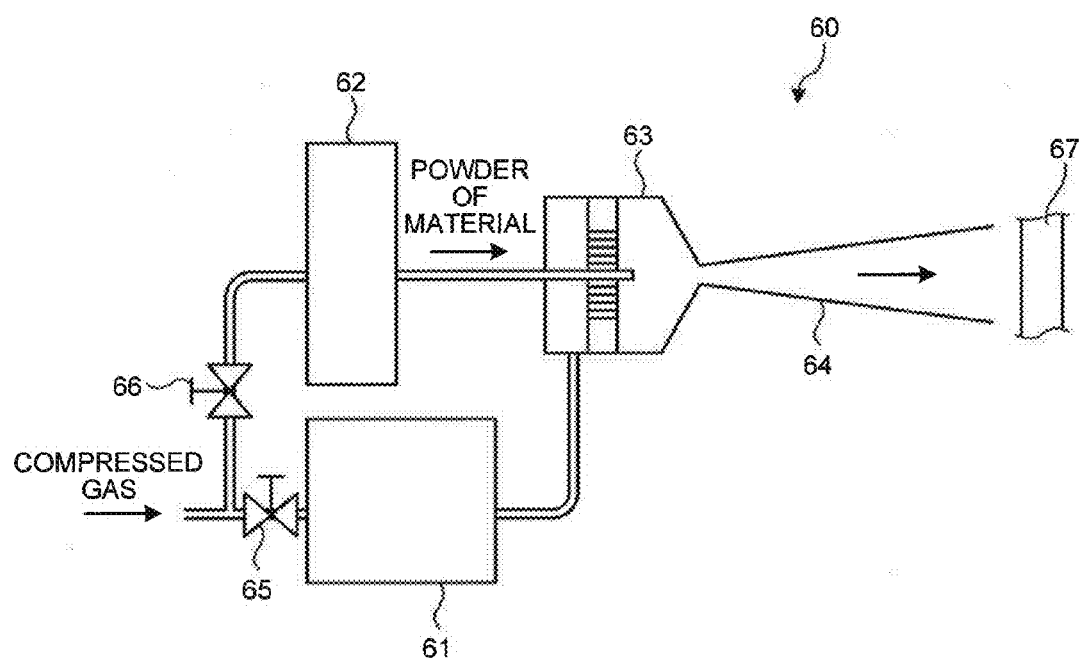
FIG. 5 is a schematic view of an overview of a cold spray device.

FIG. 5 is a schematic view of an overview of a cold spray device for use in formation of the metal deposit layer 105. As illustrated in FIG. 5, a cold spray device 60 includes: a gas heater 61 that heats a compressed gas; a powder supplier 62 that stores powder of material for the metal deposit layer 105 (hereinafter, referred to as material powder or simply powder) and supplies the same to a spray gun 63; a gas nozzle 64 that sprays the heated compressed gas and the material powder supplied to the gas onto a base member 67; and valves 65 and 66 that adjust the amount of the compressed gas to be supplied to the gas heater 61 and the powder supplier 62, respectively.

The compressed gas may be helium, nitrogen, air, or the like. The compressed gas supplied to the gas heater 61 is heated to a temperature of 50° C. or more, for example, that falls within a range of temperatures lower than the melting point of the material powder, and then is supplied to the spray gun 63. The heating temperature of the compressed gas is preferably 300 to 900° C.

Meanwhile, the compressed gas supplied to the powder supplier 62 supplies the material powder in the powder supplier 62 by a predetermined discharge amount to the spray gun 63.

The heated compressed gas is set at an ultrasonic flow (about 340 m/s or more) by the folding fan-shaped gas nozzle 64. The pressure of the compressed gas at that time is preferably set to about 1 to 5 MPa. By adjusting the pressure of the compressed gas to this degree, it is possible to improve adhesion strength of the material powder (film) with respect to the base member 67. More preferably, the compressed gas is processed under a pressure of about 2 to 4 MPa. The material powder supplied to the spray gun 63 is accelerated by being put into the ultrasonic flow of the compressed gas. Then, the material powder in the solid-phase state collides with the base member 67 at a high speed, and is deposited on the base member 67 (refer to FIG. 5). The cold spray device is not limited to the cold spray device 60 illustrated in FIG. 5 as far as the device allows the material powder in the solid-phase state to collide with the base member 67 to form a film.

Figure 6:
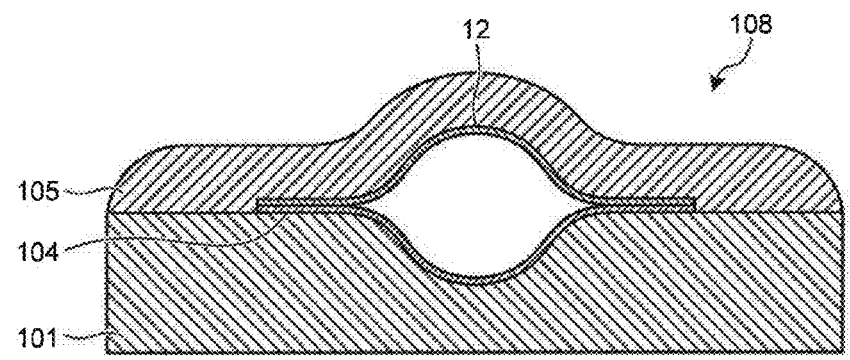
FIG. 6 is a cross-section view of a metal deposit layer formed on the pipe by a cold spray method.

At the foregoing cold spray device 60, the base member 101 with the pipe 104 fitted is disposed as base member 67 and a film is formed on the deposit layer formation surface 108. At that time, when the material powder is evenly sprayed from the gas nozzle 64 onto the deposit layer formation surface 108, the metal deposit layer 105 has a shape in which the tops and surrounding portions of the convex portions 12 bulge as illustrated in FIG. 6. Thus, if it is necessary to flatten the upper surface of the metal deposit layer 105, the metal deposit layer 105 is deposited with a large thickness and then unnecessary portions of the metal deposit layer 105 may be removed by cutting or the like. Alternatively, at formation of the metal deposit layer 105, an increased amount of powder may be sprayed onto regions other than the convex portions 12 (increased amount of spraying time or increased number of spraying operations) to control and flatten the entire upper surface of the metal deposit layer 105.

Accordingly, the member with flow passage 100 illustrated in FIG. 1 is completed.

Next, the reason for fabricating the pipe 104 from the plate-like members 102 and 103 in the first embodiment will be described.

Figure 7:
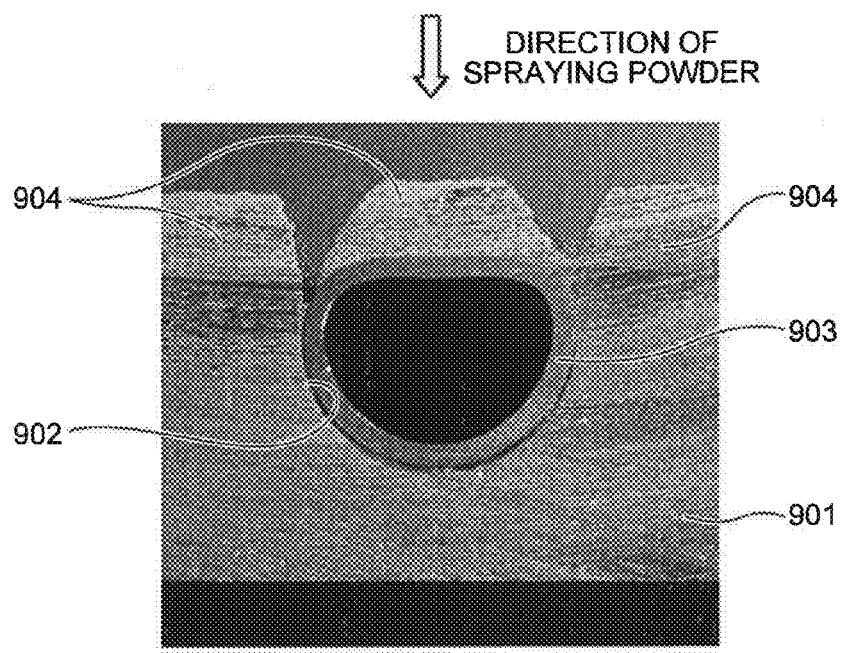
FIG. 7 is a photograph of a metal deposit layer formed on a pipe as a comparative example.

FIG. 7 is a photograph of a cross section of a structure in which a pipe 903 having a partly flattened circular cross section is placed in a concave portion 902 of a base member 901, and a metal deposit layer 904 is formed by the cold spray method on upper surfaces of the pipe 903 and the base member 901. As illustrated in FIG. 7, the metal deposit layer 904 is formed on the upper surface of the base member 901 and the flat portion of the pipe 903. However, the metal deposit layer 904 is hardly formed on side portions of the pipe 903, in particular, in a gap between the pipe 903 and the concave portion 902.

From the foregoing experimental results, the inventors of the present invention have conceived that it is difficult to form an even metal deposit layer on a pipe and surrounding portions when there is a gap almost parallel to the spraying direction of powder between the pipe and a concave portion for placement of the pipe or when there is a plane parallel to the spraying direction of powder between the pipe and the concave portion.

Accordingly, the inventors of the present invention have conducted earnest studies on the shape of a pipe that allows the formation of an even metal deposit layer on the pipe and surrounding portions, and finally have come to devise the present invention in which the pipe 104 is formed using the plate-like members 102 and 103 with the convex portions.

Figure 8:
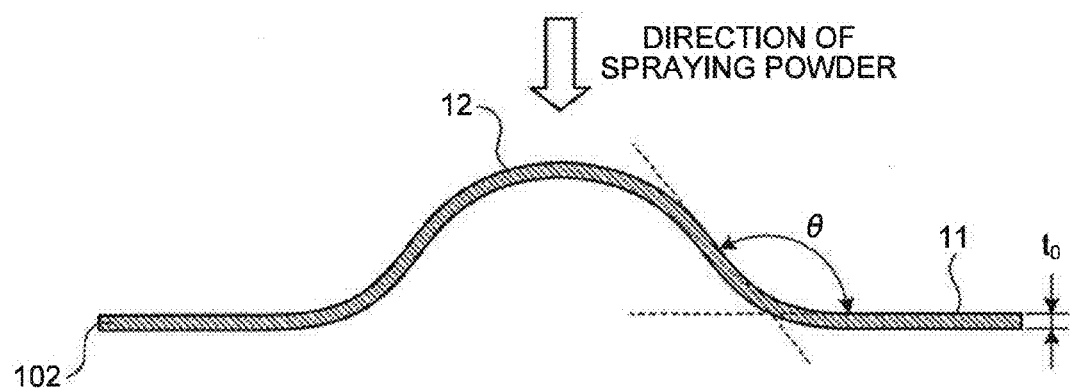
FIG. 8 is a cross-section view of a detailed shape of a plate-like member.

FIG. 8 is a diagram for describing requirements for shape and thickness of the plate-like member 102 as a member constituting the pipe 104 arranged on the metal deposit layer 105 side. As illustrated in FIG. 8, angle θ formed by the flat plate portion 11 and the convex portion 12 is preferably set at 90° or more, more preferably 110° or more. In other words, the angle formed by the flat plate portion 11 and the direction in which the convex portion 12 rises with respect to the flat plate portion 11 (elevation angle, 180°−θ) is preferably set smaller than 90°, more preferably smaller than 70°.

This is because, if the angle θ is smaller than 90°, a portion of the plate-like member 102 is hidden with respect to the spraying direction of powder from the gas nozzle 64, and thus the powder can hardly be deposited on the portion. In contrast, when the angle θ is set larger than 90°, the powder is prone to adhere to the plate-like member 102. When the angle θ becomes 110° or more, it is possible to form an even film in which the powder is almost stably deposited. The sections changing from the flat plate portion 11 to the convex portion 12 may be or may not be rounded (R) at corners.

The thickness $t_0$ of ends of the flat plate portion 11 is preferably set smaller than 0.5 mm (totally smaller than 1.0 mm when being joined to the flat plate portion 11 of the plate-like member 103), more preferably smaller than 0.1 mm (totally smaller than 0.2 mm when being joined to the flat plate portion of the plate-like member 103). This is because, as a step height in the deposit layer formation surface 108 (difference in height between the upper surface of the flat plate portion 11 and the upper surface of the base member 101) becomes larger, the powder is less prone to adhere to the end surfaces of the pipe 104, and in contrast, as the step height becomes smaller, it is possible to form an even film in the entire region of the pipe 104 including the end surfaces.

As described above, in the first embodiment, the pipe 104 is placed on the base member 101, and the metal deposit layer 105 is formed by the cold spray method on the surface of the pipe 104 (plate-like member 102-side surface) and the upper surface of the surrounding base member 101. The thus formed metal deposit layer 105 has no phase transformation or oxidation and thus offers high thermal conductivity. In addition, when the material powder collides with the base member (or film formed earlier), plastic deformation takes place between the powder and the base member to obtain an anchor effect, and oxide films of the powder and the base member are destroyed to generate a metallic bond by newly-formed surfaces. This enhances the adhesion strength of the metal deposit layer 105 and the pipe 104 and suppresses thermal resistance. In the first embodiment, since the pipe 104 is made from the plate-like member 102 meeting the foregoing requirements, it is possible to form the even metal deposit layer 105 with high adhesion strength with respect to the lower layer over the entire deposit layer formation surface 108 including the end surfaces of the pipe 104. Therefore, according to the first embodiment, it is possible to obtain favorable thermal conductivity between the pipe 104 and the metal deposit layer 105 and improve the thermal conductivity than ever before between the fluid flowing in the pipe 104 and the surface of the member with flow passage 100 at least at the metal deposit layer 105 side. In addition, it is possible to suppress shaking of the pipe 104.

EXAMPLES

A plurality of plate-like members 102 was made of SUS so as to be different in the angle θ formed by the flat plate portion 11 and the convex portion 12 and in the thickness $t_0$ of the ends of the flat plate portion 11. Each of the SUS members was directly placed with the convex portion faced upward on an aluminum (Al) base member, and was subjected to an experiment of forming a copper (Cu) film by the cold spray method. FIGS. 9 to 11G illustrate results of the experiment. At the experiment, the thickness $t_0$ is equal to the step height in the deposit layer formation surface.

FIG. 9 is a photograph showing a cross section of a structure in which an SUS member is disposed on an Al base member and a Cu film (metal deposit layer) is formed on them, where θ=120° and $t_0$=0.1 mm. In this case, as illustrated in FIG. 9, the Cu film is partially thin on the inclined surface of the convex portion, but can be formed on the entire SUS member and the Al base member without a gap therebetween.

FIG. 10A is a table giving the states of a Cu film in region A (FIG. 9) with changes in the angle θ. FIG. 10B is a photograph of the enlarged region A and its neighboring region with θ=110°. FIG. 10C is an SEM (scanning electron microscope) photograph of the enlarged region A and its neighboring region with θ=110°.

As illustrated in FIG. 10A, when θ≤100°, the copper film has some pores therein. This is possibly because the deposit density of Cu powder was partially lowered (refer to FIG. 10B). Meanwhile, when θ≥110°, the copper film has no pore therein, and thus it is possible to form an even Cu film with high density (refer to FIG. 10C).

Figure 11D:
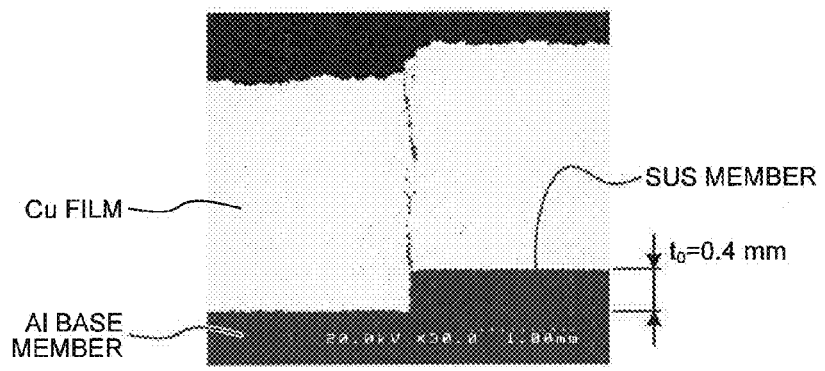
FIG. 11D is a photograph showing the state of the copper film with $t_0$=0.4 mm.

FIG. 11A is a table giving the states of a Cu film in region B (refer to FIG. 9) with changes in the thickness $t_0$. FIGS. 11B to 11G are SEM photographs of the region B and its neighboring region corresponding to the cases where $t_0$=0.1 mm, 0.2 mm, 0.4 mm, 0.8 mm, 1.0 mm, and 2.0 mm.

As illustrated in FIGS. 11A to 11C, when the thickness $t_0$ of end portions of the SUS member (step height from the Al base member) is 0.2 mm or less, it is possible to form a Cu film even on the side surface of the SUS member without a gap. It is also possible to form an even Cu film integrally on the SUS member and the Al base member.

Figure 11E:
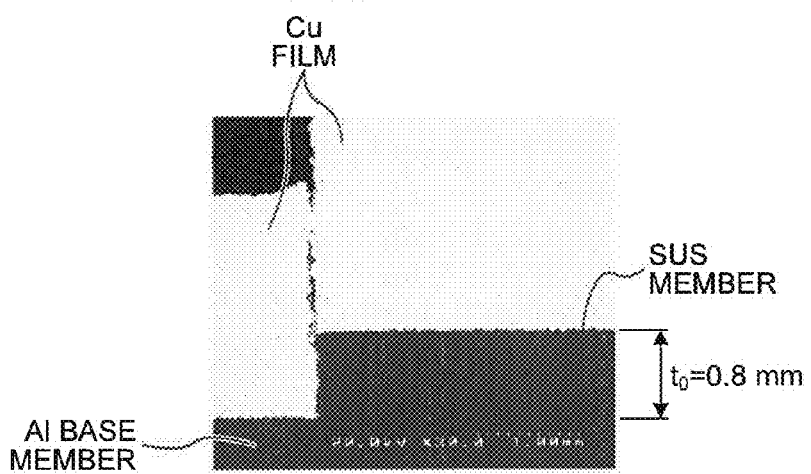
FIG. 11E is a photograph showing the state of the copper film with $t_0$=0.8 mm.

As illustrated in FIGS. 11D and 11E, when the thickness $t_0$=0.4 mm or 0.8 mm, the deposited Cu film has a partially gap therein, but the Cu film can be formed on the side surface of the SUS member without a gap.

Figure 11F:
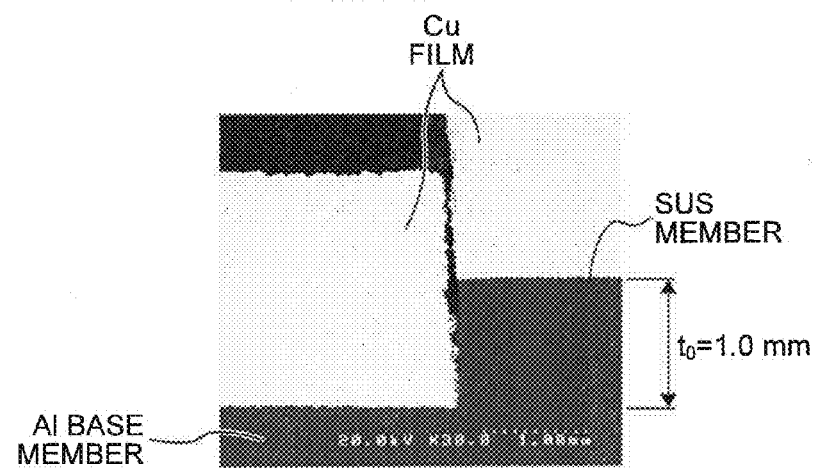
FIG. 11F is a photograph showing the state of the copper film with $t_0$=1.0 mm.
Figure 11G:
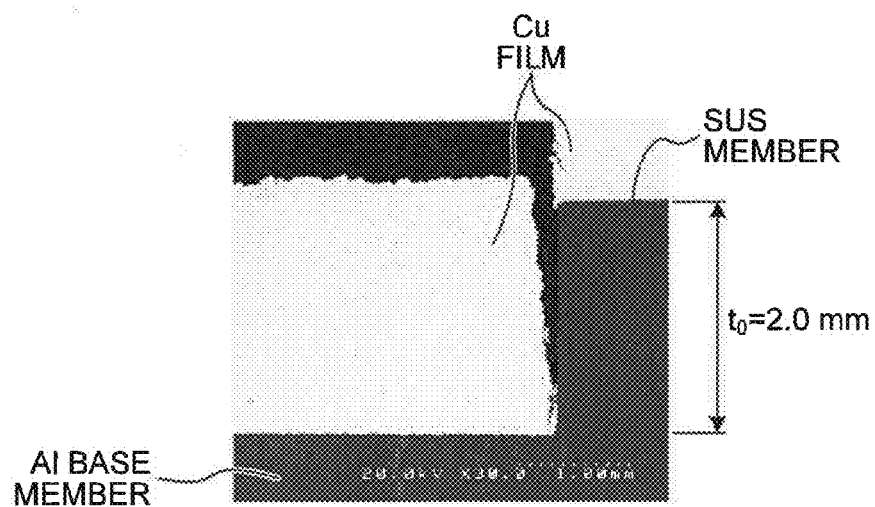
FIG. 11G is a photograph showing the state of the copper film with $t_0$=2.0 mm.

Meanwhile, as illustrated in FIGS. 11F and 11G, when the thickness $t_0$=1.0 mm or 2.0 mm, it is difficult to form a Cu film on the side surface of the SUS member, and as the thickness $t_0$ is increased, the gap between the side surface of the SUS member and the Cu film becomes larger. In addition, the Cu film formed on the Al base member and the Cu film formed on the SUS member are fully separated from each other.

Modification Example 1-1

Figure 12:
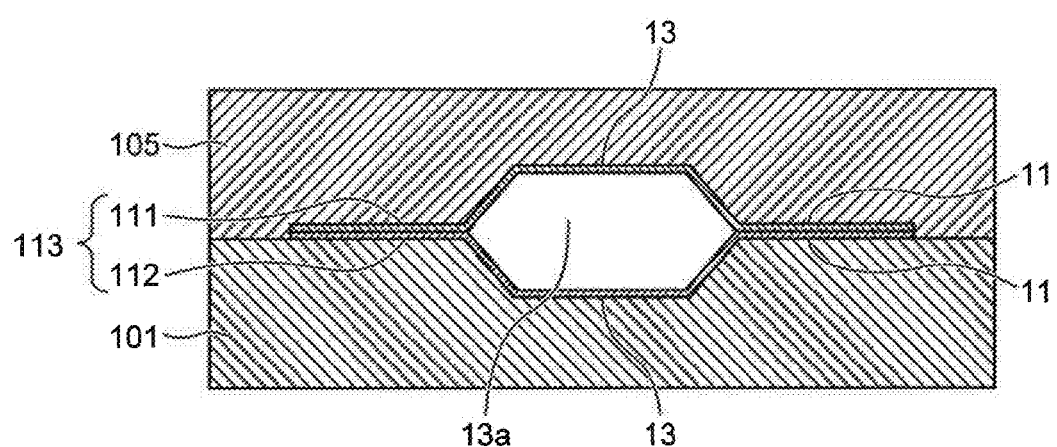
FIG. 12 is a cross-section view of a member with flow passage according to modification example 1-1.
Figure 13:
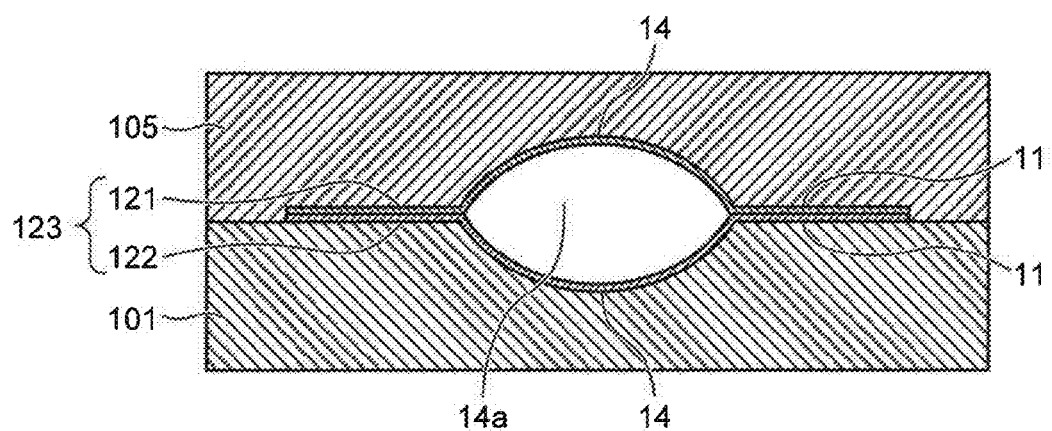
FIG. 13 is a cross-section view of a member with flow passage according to modification example 1-1.
Figure 14:
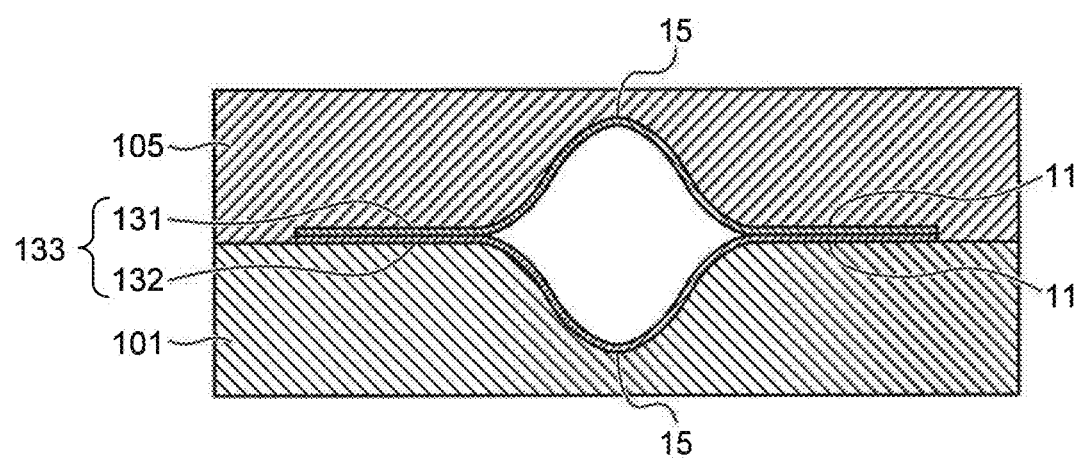
FIG. 14 is a cross-section view of a member with flow passage according to modification example 1-1.

Next, modification example 1-1 of the first embodiment will be described. FIGS. 12 to 14 are cross-section views of structures of a member with flow passage according to modification example 1-1.

In the member with flow passage, the shape of the convex portions of the plate-like members forming the flow passage is not limited to that illustrated in FIG. 1. For example, as illustrated in FIG. 12, plate-like members 111 and 112 having convex portions 13 surrounded by three sides may be joined together to fabricate a pipe 113 and form a flow passage 13a with a hexagonal cross section. The vertexes of the hexagon may be rounded.

As illustrated in FIG. 13, plate-like members 121 and 122 having approximately semi-elliptical convex portions 14 may be joined together to fabricate a pipe 123 and form a flow passage 14a with an approximately elliptical cross section. In this case, it is preferred to set the angle formed by the flat plate portion 11 and the convex portion 14 so as to exceed 90° in a region changing from the flat plate portion 11 to the convex portion 14 by rounding the vertex of the relevant portion or slightly flattening the approximately elliptical flow passage 14a.

Alternatively, as illustrated in FIG. 14, plate-like members 131 and 132 having sine-curve convex portions 15 may be joined together to fabricate a pipe 133. In this case, the region changing from the flat plate portion 11 to the convex portion 15 curves gently, thereby making it easier to form the even metal deposit layer 105 in the changing region.

Modification Example 1-2

Figure 15:
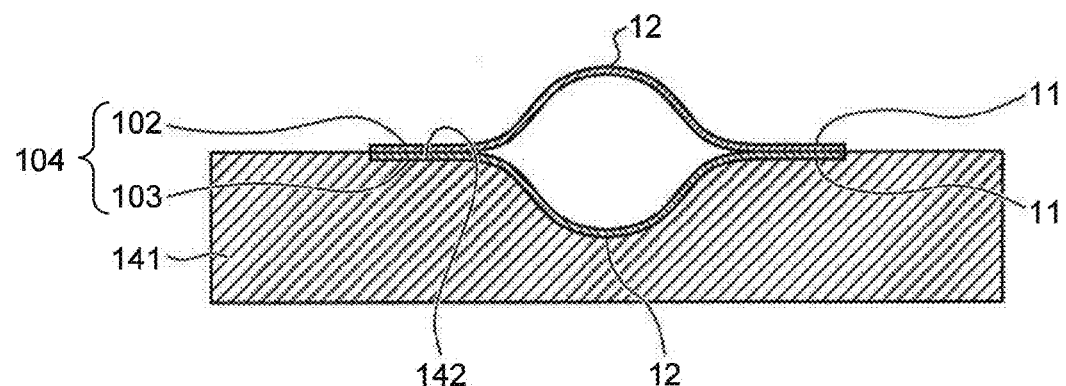
FIG. 15 is a cross-section view of a member with flow passage according to modification example 1-2.
Figure 16:
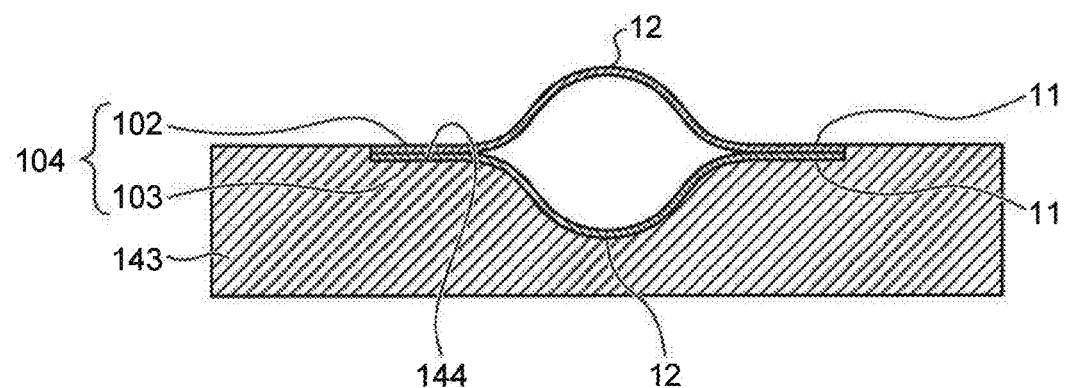
FIG. 16 is a cross-section view of a member with flow passage according to modification example 1-2.

Next, modification example 1-2 of the first embodiment will be described. FIGS. 15 and 16 are cross-section views of structures of part of a member with flow passage according to modification example 1-2, illustrating the state before formation of the metal deposit layer 105 (refer to FIG. 1).

In the first embodiment described above, only the convex portion 12 of the plate-like member 103 is placed in the concave portion 107 of the base member 101. Alternatively, as illustrated in FIG. 15, for example, the flat plate portion 11 of the plate-like member 103 may also be placed in a base member 141. In this case, the base member 141 may be provided with a concave portion 142 in which the convex portion 12 and the flat plate portion 11 of the plate-like member 103 can be placed. According to modification example 1-2, it is possible to reduce restrictions on the thickness $t_0$ of the flat plate portions 11 of the plate-like members 102 and 103.

Alternatively, as illustrated in FIG. 16, a base member 143 may be provided with a concave portion 144 in which the flat plate portion 11 of the plate-like member 102 can also be placed. In this case, the upper surface of the flat plate portion 11 of the plate-like member 102 and the upper surface of the base member 143 are unified in height, which eliminates restrictions on the thickness $t_0$ of ends of the flat plate portions 11.

Modification example 1-2 may be applied to modification example 1-1.

Modification Example 1-3

Figure 17:
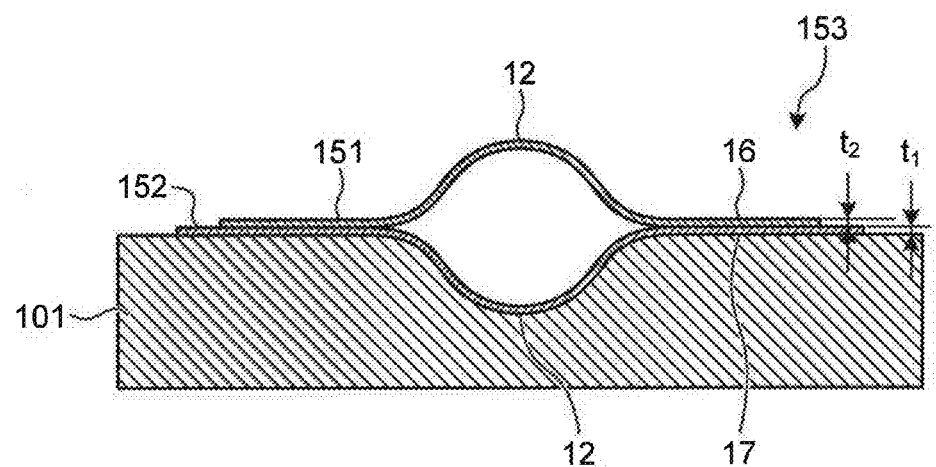
FIG. 17 is a cross-section view of a member with flow passage according to modification example 1-3.
Figure 18:
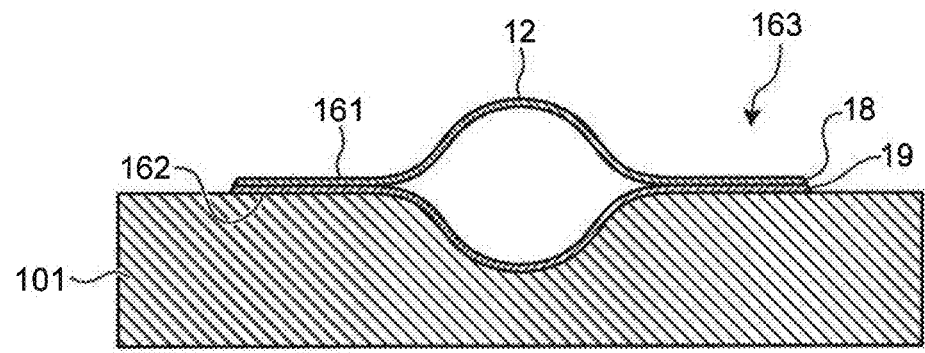
FIG. 18 is a cross-section view of a member with flow passage according to modification example 1-4.
Figure 19:
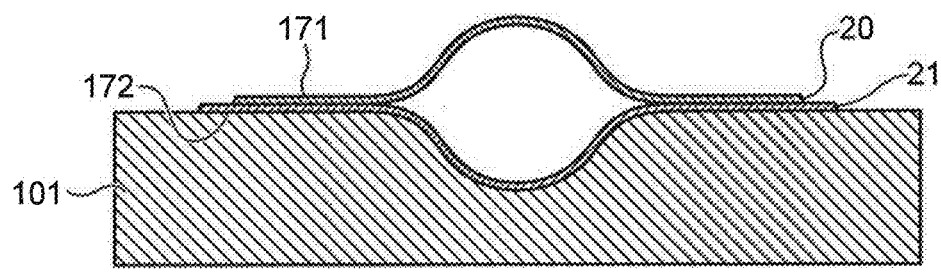
FIG. 19 is a cross-section view of a member with flow passage according to modification example 1-5.

Next, modification example 1-3 of the first embodiment will be described. FIGS. 17 to 19 are cross-section views of structures of part of a member with flow passage according to modification example 1-3, illustrating the state before formation of the metal deposit layer 105 (refer to FIG. 1).

In the first embodiment described above, the flat plate portions 11 of the plate-like members 102 and 103 are unified in width. Alternatively, as illustrated in FIG. 17, a flat plate portion 17 of a plate-like member 152 disposed on the base member 101 side may be wider than a flat-plate portion 16 of a plate-like member 151 disposed on the plate-like member 152 such that end portions of the plate-like member 152 extend outward than end portions of the plate-like member 151.

As described above, to form the even metal deposit layer 105 (refer to FIG. 1) on the end surfaces of the flat plate portions 11 by the cold spray method, it is preferred to set the step height in the deposit layer formation surface 108 to be 0.8 mm or less. Thus, in the first embodiment, since the two plate-like members 102 and 103 are to be joined together, the thickness of the flat plate portions 11 of the plate-like members 102 and 103 needs to be set at 0.4 mm or less. However, in modification example 1-3, since the step height in the deposit layer formation surface 153 is changed in two stages, thickness $t_1$ of the plate-like member 152 and thickness $t_2$ (plate thickness) of the plate-like member 151 may be set at 0.8 mm or less. Therefore, in this case, it is possible to reduce restrictions on the thicknesses $t_1$ and $t_2$.

Modification Example 1-4

In modification example 1-4, as illustrated in FIG. 18, plate-like members 161 and 162 have ends of flat plate portions 18 and 19 cut in a tapered shape so as to be wider with increasing proximity to the base member 101. At that time, the end surface of the plate-like member 162 on the base member 101 side extends outward than the end surface of the plate-like member 161 disposed on the plate-like member 162. Accordingly, the upper surface of the base member 101 and the upper surface of the flat plate portion 18 are connected with inclined surfaces to suppress influence of the step height in a deposit layer formation surface 163. In this case, it is possible to form the even metal deposit layer 105 on the ends of the flat plate portions 18 and 19 (that is, inclined surfaces), which reduces restrictions on the thickness of the flat plate portions 18 and 19.

Modification Example 1-5

As illustrated in FIG. 19, in modification example 1-5, plate-like members 171 and 172 have ends of flat plate portions 20 and 21 cut in a tapered shape so as to be wider with increasing proximity to the base member 101, and the flat plate portion 21 on the base member 101 side extends outward than the other flat plate portion 20. Accordingly, it is possible to further reduce restrictions on the plate thickness of the flat plate portions 20 and 21.

Second Embodiment

Next, a second embodiment of the present invention will be described.

Figure 20:
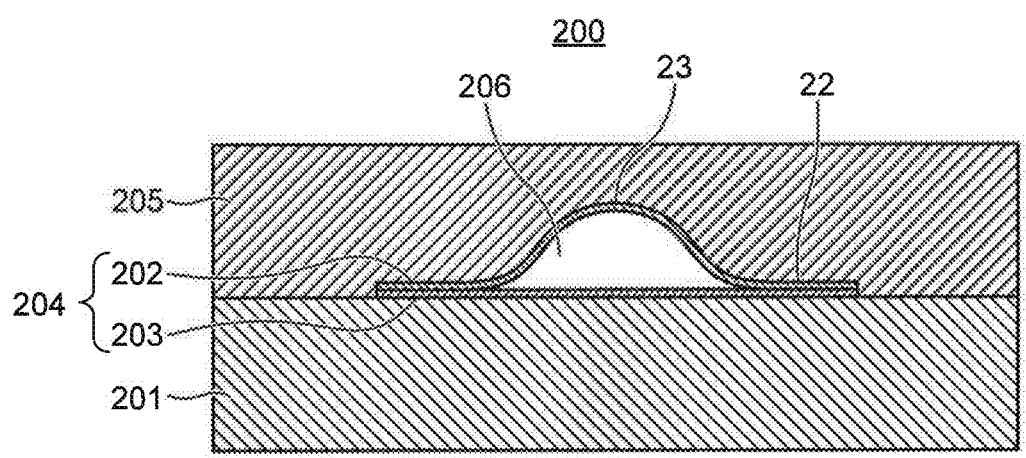
FIG. 20 is a cross-section view of a member with flow passage according to a second embodiment of the present invention.

FIG. 20 is a cross-section view of a structure of a member with flow passage according to the second embodiment. As illustrated in FIG. 20, a member with flow passage 200 according to the second embodiment includes a base member 201, a pipe 204 composed of plate-like members 202 and 203, and a metal deposit layer 205 formed by the cold spray method. The materials for the base member 201, the pipe 204, and the metal deposit layer 205 are the same as those described above in relation to the first embodiment.

Figure 21:
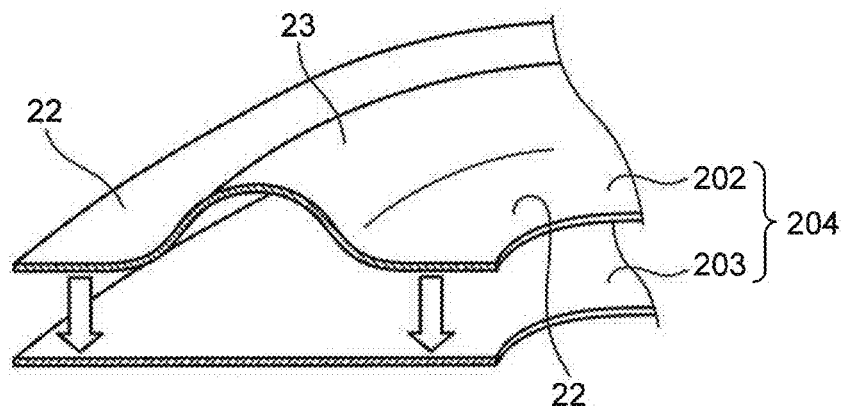
FIG. 21 is a perspective view for describing a fabrication process of a pipe illustrated in FIG. 20.

As illustrated in FIG. 21, one plate-like member 202 has two flat plate portions 22 passing over one and the same plane and a convex portion 23 between the two flat plate portions 22, as with the plate-like member 102 illustrated in FIG. 1. The other plate-like member 203 has a flat-plate shape. The plate-like member 202 is joined to the plate-like member 203 at main surfaces of the flat plate portions 22 opposite to the top of the convex portion 23. This forms a flow passage 206 through which a fluid passes between the convex portion 23 and the plate-like member 203. The requirements for the shape and thickness of the plate-like member 202 are the same as those for the plate-like member 102 described above in relation to the first embodiment.

The member with flow passage 200 is manufactured by fixing the pipe 204 to the upper surface of the flat-shaped base member 201 and forming the metal deposit layer 205 using a cold spray device 60 on the surface of the pipe 204 and the upper surface of the surrounding base member 201.

According to the second embodiment described above, the lower surface of the pipe 204 has a flat-plate shape, which eliminates the need to form a concave portion in the base member 201 and simplifies the manufacturing process.

In the second embodiment, the cross section of the convex portion 23 may have a desired shape as in modification example 1-1 of the first embodiment described above. In addition, as in modification examples 1-2 to 1-5, a concave portion for placement of the plate-like member 203 or the flat plate portion 22 may be provided in the upper surface of the base member 201 to reduce or eliminate the step height between the upper surface of the base member 201 and the upper surface of the flat plate portion 22.

Modification Example 2-1

Next, modification example 2-1 of the second embodiment will be described.

In the second embodiment, the flat plate-shaped plate-like member 203 is joined to the plate-shaped member 202 having the convex portion 23. Instead, a second plate-like member having a convex portion in the same orientation as that of the plate-like member 202 may be joined to the plate-like member 202. In this case, the convex portion of the second plate-like member may be shallower than the convex portion 23. This forms a space constituting a flow passage between the plate-like member 202 and the second plate-like member. In this case, the upper surface of the base member 201 on which the second plate-like member is placed may be formed in the convex shape to reduce a gap generated between the base member 201 and the second plate-member.

Third Embodiment

Next, a third embodiment of the present invention will be described.

Figure 22:
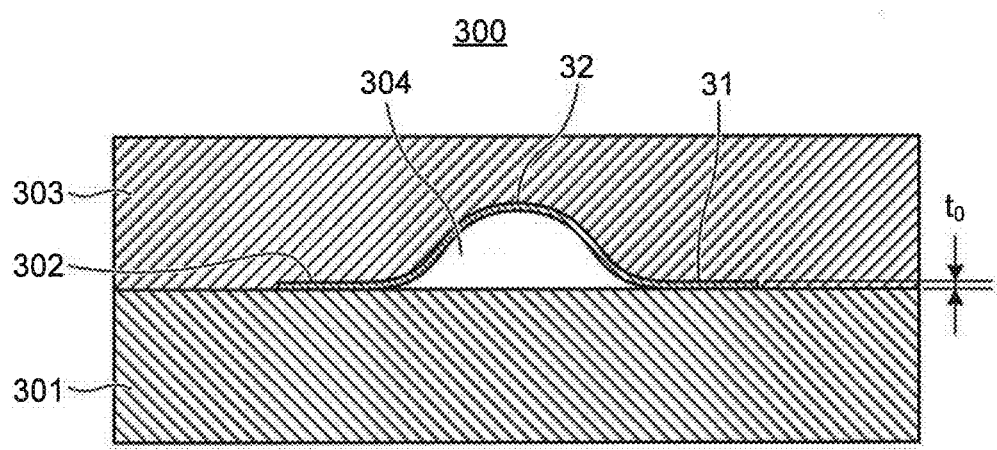
FIG. 22 is a cross-section view of a member with flow passage according to a third embodiment.

FIG. 22 is a cross-section view of a structure of a member with flow passage according to the third embodiment. As illustrated in FIG. 22, a member with flow passage 300 according to the third embodiment includes a base member 301, a plate-like member 302 constituting part of the flow passage together with the base member 301, and a metal deposit layer 303.

As with the plate-like member 102 illustrated in FIG. 1, the plate-like member 302 includes two flat plate portions 31 with main surfaces passing over one and the same plane and a convex portion 32 between the two flat plate portions 31. The plate-like member 302 is disposed directly on the base member 301 such that main surfaces of the flat plate portions 31 opposite to the top of the convex portion 32 are oriented to the base member 301. This forms flow passage 304 to distribute a fluid between the convex portion 32 and the base member 301. The requirements for the shape and the thickness $t_0$ of the plate-like member 302 are the same as those described above in relation to the first embodiment.

Materials for the base member 301, the plate-like member 302, and the metal deposit layer 303 are the same as those described above in relation to the first embodiment and may be appropriately selected according to a fluid to be flown in the flow passage 304. In particular, since in the third embodiment, the fluid contacts directly the base member 301, the base member 301 may be formed by a material with corrosion resistance to the fluid. For example, in the case of flowing urban water or sea water in the flow passage, it is preferred to form the base member 301 from SUS.

The member with flow passage 300 is manufactured by fixing the plate-like member 302 on an upper surface of the base member 301 and forming the metal deposit layer 303 using the cold spray device 60 on the surface of the plate-like member 302 and the upper surface of the surrounding base member 301.

According to the third embodiment described above, it is possible to reduce the number of components constituting the member with flow passage 300 and simplify the manufacturing process.

In the third embodiment, the convex portion 32 may have a desired shape as in modification example 1-1 of the first embodiment. In addition, as in modification examples 1-2 and 1-4, a concave portion for placement of the flat plate portion 31 may be provided on the upper surface of the base member 301 or the ends of the flat plate portions 31 may be formed in a tapered shape to reduce or eliminate the step height between the upper surface of the base member 301 and the upper surface of the flat plate portions 31.

Fourth Embodiment

Next, a fourth embodiment of the present invention will be described.

Figure 23:
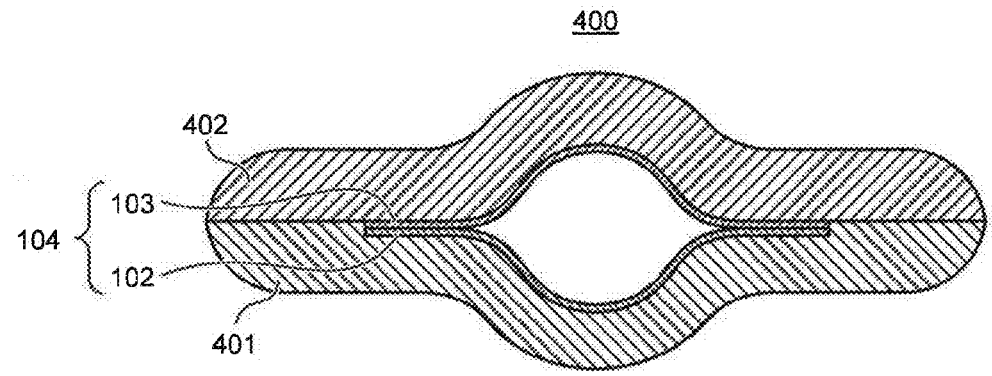
FIG. 23 is a cross-section view of a structure of a member with flow passage according to a fourth embodiment.

FIG. 23 is a cross-section view of a structure of a member with flow passage according to the fourth embodiment. As illustrated in FIG. 23, a member with flow passage 400 according to the fourth embodiment includes the pipe 104 formed by the plate-like members 102 and 103 and metal deposit layers 401 and 402 formed by the cold spray method on both sides of the pipe 104. Materials for the plate-like members 102 and 103 and the metal deposit layers 401 and 402 are the same as those described above in relation to the first embodiment.

Figure 24:
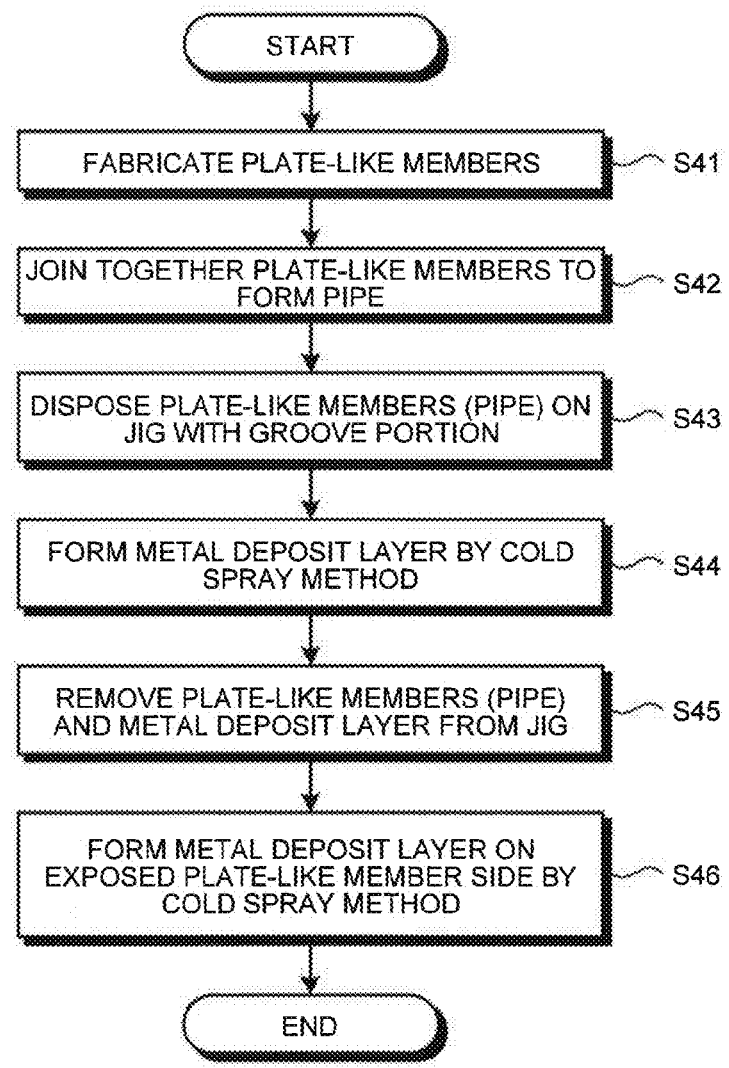
FIG. 24 is a flowchart of a method for manufacturing the member with flow passage according to the fourth embodiment.

A method for manufacturing the member with flow passage according to the fourth embodiment will be described with reference to FIGS. 24 to 25B. FIG. 24 is a flowchart of a method for manufacturing the member with flow passage according to the fourth embodiment. Steps S41 and S42 described in FIG. 24 correspond to steps S11 and S12 described in FIG. 3, and thus descriptions thereof will be omitted.

Figure 25A:
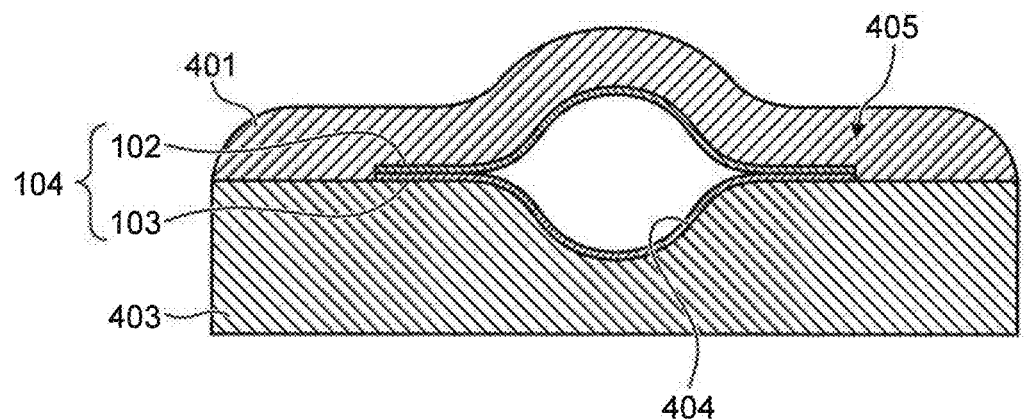
FIG. 25A is a cross-section view for describing the method for manufacturing the member with flow passage according to the fourth embodiment.

At step S43, as illustrated in FIG. 25A, a concave portion 404 for placement of the convex portion 12 of the plate-like member 103 is formed in advance in a jig 403, and the pipe 104 fabricated from the plate-like members 102 and 103 is placed on the jig 403. At that time, one plate-like member 103 may be tentatively fixed to the jig 403 by an adhesive or the like, or the convex portion 12 may be simply fitted into the concave portion 404.

At subsequent step S44, the metal deposit layer 401 is formed by the cold spray method on the surface of the pipe 104 and the upper surface of the surrounding jig 403 as a deposit layer formation surface 405.

Figure 25B:
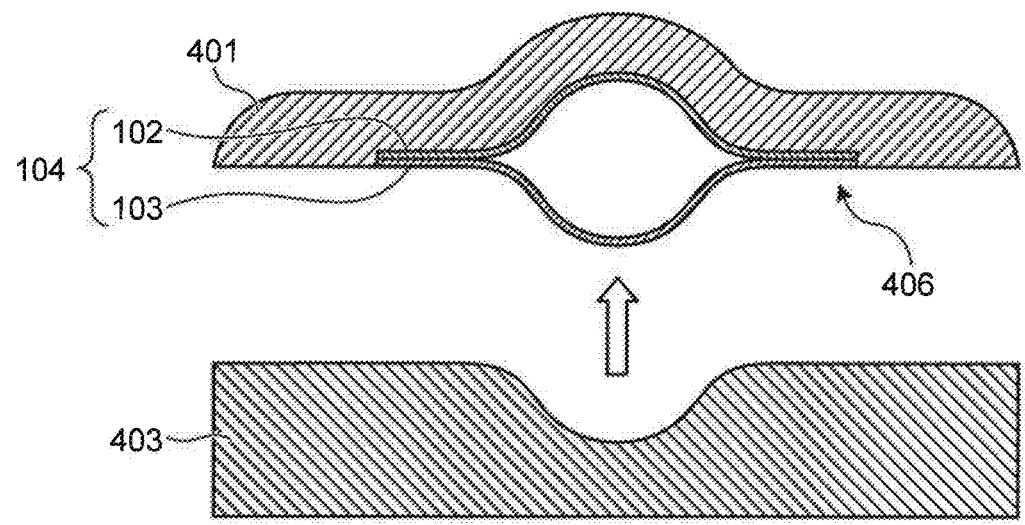
FIG. 25B is a cross-section view for describing the method for manufacturing the member with flow passage according to the fourth embodiment.

At step S45, as illustrated in FIG. 25B, the plate-like members 102 and 103 (pipe 104) and the metal deposit layer 401 are removed from the jig 403.

Further, at step S46, the metal deposit layer 402 is formed by the cold spray method on the surfaces of the exposed plate-like member 103 and the surrounding metal deposit layer 401 as a deposit layer formation surface 406. Accordingly, the member with flow passage 400 is completed such that the pipe 104 is covered with the metal deposit layers 401 and 402. After that, the metal deposit layers 401 and 402 may be shaped by cutting away unnecessary portions or the like.

According to the fourth embodiment described above, the metal deposit layers 401 and 402 having high adhesion strength with respect to the pipe surface are formed on the entire circumference of the pipe 104. Accordingly, it is possible to improve thermal conductivity as compared to conventional one between the fluid flown in the pipe 104 and the both surfaces of the member with flow passage 400.

The method for manufacturing the member with flow passage according to the fourth embodiment may be applied to the members with flow passage according to the second embodiment and modification example 2-1.

REFERENCE SIGNS LIST 11, 16 to 22, and 31 FLAT PLATE PORTION
12 to 15, 23, and 32 CONVEX PORTION
13a and 14a FLOW PASSAGE
60 COLD SPRAY DEVICE
61 GAS HEATER
62 POWDER SUPPLYER
63 SPRAY GUN
64 GAS NOZZLE
65 and 66 VALVE
100, 200, 300, and 400 MEMBER WITH FLOW PASSAGE
101, 141, 143, 201, 301, and 901 BASE MEMBER
102, 103, 111, 121, 131, 151, 152, 161, 171, 202, 203, and 302 PLATE-LIKE MEMBER
104, 113, 123, 133, 204, and 903 PIPE
105, 205, 303, 401, 402, and 904 METAL DEPOSIT LAYER
106, 206, and 304 FLOW PASSAGE (SPACE)
107, 142, 144, 404, and 902 CONCAVE PORTION
108, 153, 163, 405, and 406 DEPOSIT LAYER FORMATION SURFACE
403 JIG

The invention claimed is:

1. A member with a flow passage provided thereinside, comprising:
   a base member made of metal or alloy;
   a plate-like member made of metal or alloy in a plate-like shape, including: two flat plate portions that are positioned at both widthwise ends and have main surfaces passing over one and the same plane; and a convex portion that is provided between the two flat plate portions and has a cross section shaped in a thickness direction so as to protrude with respect to the flat plate portions, and forming the flow passage; and
   a metal deposit layer that is formed by, while main surfaces of the flat plate portions opposite to a top of the convex portion are facing the base member, accelerating powder of metal or alloy together with a gas, and spraying and depositing the powder in a solid-phase state on a surface of the plate-like member at the top side of the convex portion and a surface of the base member, wherein end portions of the plate-like member are wider with increasing proximity to the base member.

2. A member with a flow passage provided thereinside, comprising:
   a base member made of metal or alloy;
   a plate-like member made of metal or alloy in a plate-like shape, including: two flat plate portions that are positioned at both widthwise ends and have main surfaces passing over one and the same plane; and a convex portion that is provided between the two flat plate portions and has a cross section shaped in a thickness direction so as to protrude with respect to the flat plate portions, and forming the flow passage;
   a metal deposit layer that is formed by, while main surfaces of the flat plate portions opposite to a top of the convex portion are facing the base member, accelerating powder of metal or alloy together with a gas, and spraying and depositing the powder in a solid-phase state on a surface of the plate-like member at the top side of the convex portion and a surface of the base member; and
   a second plate-like member made of metal or alloy in a plate-like shape, and joined to the opposite main surfaces of the plate-like member such that the flow passage is formed together with the plate-like member,
   wherein the end portions of the plate-like member are wider with increasing proximity to the base member, and
   end portions of the second plate-like member are wider with increasing proximity to the base member and extend outward beyond the plate-like member.

3. The member with flow passage according to claim 2, wherein the second plate-like member has a flat-plate shape.

4. The member with flow passage according to claim 2, wherein
   the second plate-like member includes: two second flat plate portions that are positioned at both widthwise ends and have main surfaces passing over one and the same plane; and a second convex portion that is provided between the two second flat plate portions and has a cross section shaped in a thickness direction so as to protrude with respect to the second flat plate portions, and is joined at main surfaces of the two second flat plate portions opposite to a top of the second convex portion, to the opposite main surfaces of the two flat plate portions of the plate-like member,
   the base member has a concave portion that is formed on a flat surface and is capable of placement of the second convex portion, and
   the metal deposit layer is formed while the second convex portion is placed in the concave portion.

5. The member with flow passage according to claim 2, wherein the second plate-like member is wider than the plate-like member.

6. The member with flow passage according to claim 1, wherein an angle formed by the flat plate portions and a direction in which the convex portion rises with respect to the flat plate portions is smaller than 90 degrees.

7. The member with flow passage according to claim 6, wherein the angle formed by the flat plate portions and the direction in which the convex portion rises with respect to the flat plate portions is smaller than 70 degrees.

8. The member with flow passage according to claim 1, wherein a step height between the surface of the base member and the upper surface of the plate-like member is 0.8 mm or less.

9. The member with flow passage according to claim 2, wherein the base member is formed by accelerating powder of metal or alloy together with a gas, and spraying and depositing the powder in the solid-phase state at least on a surface of the second plate-like member.

10. The member with flow passage according to claim 1, wherein
    the plate-like member is made of stainless steel, copper, or copper alloy, and
    the base member and the metal deposit layer are made of aluminum or aluminum alloy.

11. The member with flow passage according to claim 2, wherein the second plate-like member is made of stainless steel, copper, or copper alloy.

12. A method for manufacturing a member with flow passage in which a flow passage is provided in the member made of metal or alloy, comprising:
    a step of placing, on a base member made of metal or alloy, a plate-like member made of metal or alloy in a plate-like shape, including: two flat plate portions that are positioned at both widthwise ends and have main surfaces passing over one and the same plane; and a convex portion that is provided between the two flat plate portions and has a cross section shaped in a thickness direction so as to protrude with respect to the flat plate portions, and forming the flow passage, such that main surfaces of the flat plate portions opposite to a top of the convex portion are facing the base member;
    a metal deposit layer formation step of forming a metal deposit layer by, while the plate-like member is placed on the base member, accelerating powder of metal or alloy together with a gas, and spraying and depositing the powder in a solid-phase state on a surface of the plate-like member at the top side of the convex portion and a surface of the base member; and
    a second metal deposit layer formation step of removing the base member, accelerating powder of metal or alloy together with a gas, and spraying and depositing the powder in a solid-phase state on a surface of a second plate-like member and an exposed surface of the metal deposit layer,
    wherein the plate-like member placing step includes placing, on the base member, the second plate-like member made of metal or alloy in a plate-like shape, and joined to the opposite main surfaces of the plate-like member such that the flow passage is formed together with the plate-like member.

13. The member with flow passage according to claim 2, wherein an angle formed by the flat plate portions and a direction in which the convex portion rises with respect to the flat plate portions is smaller than 90 degrees.

14. The member with flow passage according to claim 13, wherein the angle formed by the flat plate portions and the direction in which the convex portion rises with respect to the flat plate portions is smaller than 70 degrees.

15. The member with flow passage according to claim 2, wherein a step height between the surface of the base member and the upper surface of the plate-like member is 0.8 mm or less.

16. The member with flow passage according to claim 2, wherein
    the plate-like member is made of stainless steel, copper, or copper alloy, and
    the base member and the metal deposit layer are made of aluminum or aluminum alloy.

* * * * *